United States Patent
Sakai et al.

[11] Patent Number: 4,896,014
[45] Date of Patent: Jan. 23, 1990

[54] METHOD OF AUTOMATICALLY GRINDING AN ELECTRODE FOR SPOT WELDING USE AND APPARATUS FOR EFFECTING SAID METHOD

[75] Inventors: Hisatoshi Sakai; Takashi Shirasaki, both of Hiroshima, Japan

[73] Assignee: Mazda Motor Corporation, Hiroshima, Japan

[21] Appl. No.: 250,137

[22] Filed: Sep. 27, 1988

[30] Foreign Application Priority Data

Oct. 13, 1987 [JP] Japan ................... 62-258738

[51] Int. Cl.⁴ ............................................ B23K 11/36
[52] U.S. Cl. ............................. 219/91.2; 219/86.25; 901/42
[58] Field of Search .............. 219/86.25, 91.2, 117.1; 29/430; 901/42

[56] References Cited

U.S. PATENT DOCUMENTS 4,737,611 4/1988 Humblot ..................... 219/86.25
4,767,910 8/1988 Stevens, Jr. et al. ............ 901/42

FOREIGN PATENT DOCUMENTS 62-10975 1/1987 Japan .

Primary Examiner—Clifford C. Shaw
Attorney, Agent, or Firm—Wenderoth, Lind & Ponack

[57] ABSTRACT

An apparatus for successively automatically grinding a plurality of welding electrodes of respective spot welding machines is provided with a stand transported by a work transport conveyor of a welding line, at least one automatic dresser properly positioned on the stand and a pair of through-openings formed in the stand for properly positioning the stand with respect to a work receiving jig on which the stand is placed. The stand is initially placed on a hanger of the conveyor and transported to one of a plurality of work stations by the conveyor. At the work station, the stand is properly positioned with respect to and placed on the work receiving jig. The welding electrode of the spot welding machine located at this work station is then automatically ground by the automatic dresser. Upon completion of grinding at this work station, the stand is further transported to the adjoining work station. In this way, the welding electrodes of all the spot welding machines are successively automatically ground by the automatic dresser.

12 Claims, 4 Drawing Sheets

METHOD OF AUTOMATICALLY GRINDING AN ELECTRODE FOR SPOT WELDING USE AND APPARATUS FOR EFFECTING SAID METHOD

BACKGROUND OF THE INVENTION

1. Field of the Invention

The present invention relates to a method of automatically grinding, with the use of an automatic dresser, a welding electrode of each of a plurality of spot welding machines arrayed along a welding line. The present invention also relates to an apparatus for effecting this method.

2. Description of the Prior Art

Japanese Utility Model Laid-Open Application No. 62-10975 discloses an automatic electrode shaping or grinding machine provided with a holding mechanism for securely holding an electrode chip of a spot welding machine. This automatic electrode grinding machine is installed beside the spot welding machine. When the spot welding machine is out of operation, the electrode chip held by the chip holding mechanism is transported to a position confronting a grinding tool to be ground thereby. According to this disclosure, a plurality of spot welding machines are installed together with respective automatic electrode grinding machines. When a large number of spot welding machines are arranged along a welding line, as many automatic electrode grinding machines are needed, thus resulting disadvantageously in an increased cost of equipment and maintenance. If the welding line does not have enough space to install so many automatic electrode grinding machines corresponding to respective spot welding machines, a worker is obliged to use a grinding tool to grind the electrode of each spot welding machine in a condition in which the welding line is out of operation. Such a welding line requires complicated operations and interrupting the operation of the welding line lowers its productivity.

SUMMARY OF THE INVENTION

Accordingly, the present invention has been developed with a view to substantially eliminating the above described disadvantages inherent in the prior art method and apparatus for automatically grinding an electrode for spot welding use, and has for its essential object to provide an improved automatic electrode grinding method and apparatus which are capable of successively grinding a large number of welding electrodes of respective spot welding machines with the use of a single grinding apparatus in order to lower the cost of equipment and maintenance.

Another important object of the present invention is to provide an automatic electrode grinding method and apparatus of the above described type which are capable of automatically grinding the aforementioned electrodes without interrupting the operation of a welding line.

In accomplishing these and other objects, according to one preferred embodiment of the present invention, there is provided a method of automatically grinding an electrode for spot welding use, in which a stand having thereon at least one automatic dresser for grinding a welding electrode of a spot welding machine is transported by a work transport means of a welding line. The welding electrode is then automatically ground by the automatic dresser when the stand has reached a work station which is provided with at least one of a plurality of spot welding machines installed along the welding line. In this way, the welding electrodes of all the spot welding machines are successively automatically ground by the automatic dresser.

In another aspect of the present invention, there is provided an apparatus for automatically grinding a welding electrode of each of a plurality of spot welding machines installed along a welding line. The apparatus of the present invention includes a stand transported by a work transport means of the welding line, at least one automatic dresser properly positioned on the stand and a positioning means for positioning the stand with respect to a work receiving jig of the welding line.

By the above described construction, the stand transported by the work transport means is properly positioned with respect to the work receiving jig by the positioning means. In such a condition, the welding electrode of the spot welding machine is brought into contact with and automatically ground by the automatic dresser.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENT

Figure 1:
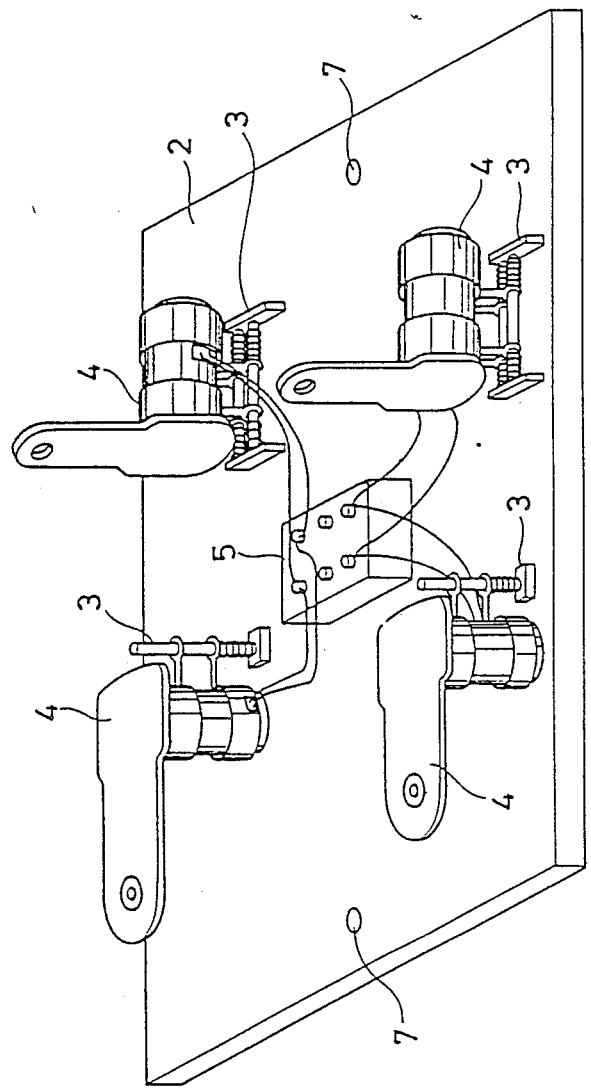
FIG. 1 is a perspective view of an apparatus for automatically grinding a welding electrode of a spot welding machine according to the present invention.
Figure 2:
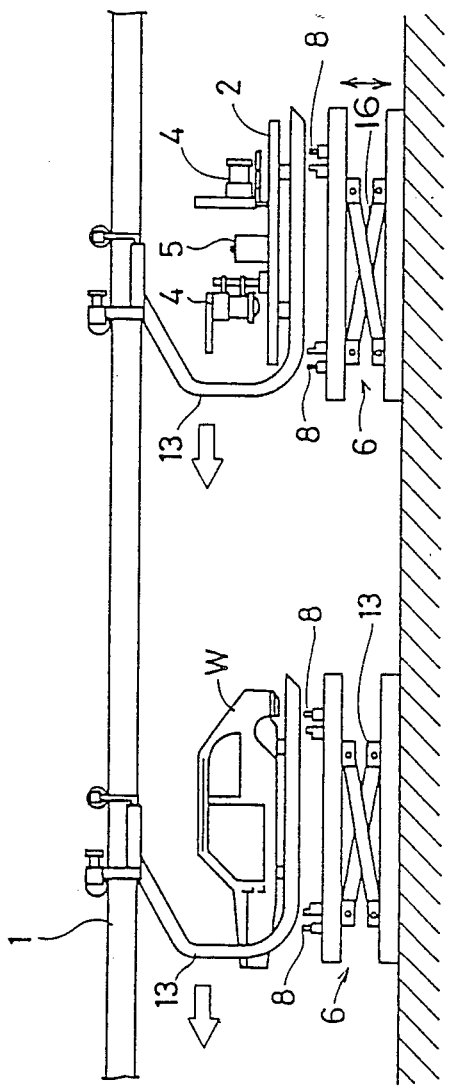
FIG. 2 is an elevational view of a work transport means of a welding line.

FIGS. 1 and 2 depict an apparatus for automatically grinding a welding electrode of a spot welding machine according to one preferred embodiment of the present invention. The automatic grinding apparatus is comprised of a stand 2, a plurality of automatic dressers 4 properly positioned on the stand 2 by way of respective support brackets 3 and a driving means 5 including a power source, a control circuit and the like for driving the automatic dressers 4. The stand 2 is transported by a work transport means 1 comprising an overhead conveyor which travels along a welding line. In the stand 2 are formed a pair of through-openings 7 for positioning use and which constitute a positioning means of the stand 2 with respect to each of a plurality of work receiving jigs or fixtures 6 installed at respective work stations of the welding line. When the automatic grinding apparatus is properly positioned with respect to and placed on a certain work receiving jig 6, top end portions of a pair of positioning pins 8 formed on the work receiving jig 6 are inserted into the through-openings 7 of the stand 2.

Figure 3:
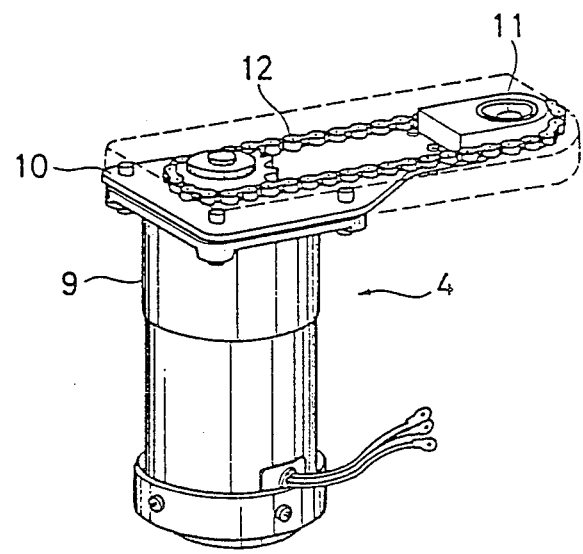
FIG. 3 is a perspective view of an automatic dresser mounted in the apparatus of FIG. 1.
Figure 4:
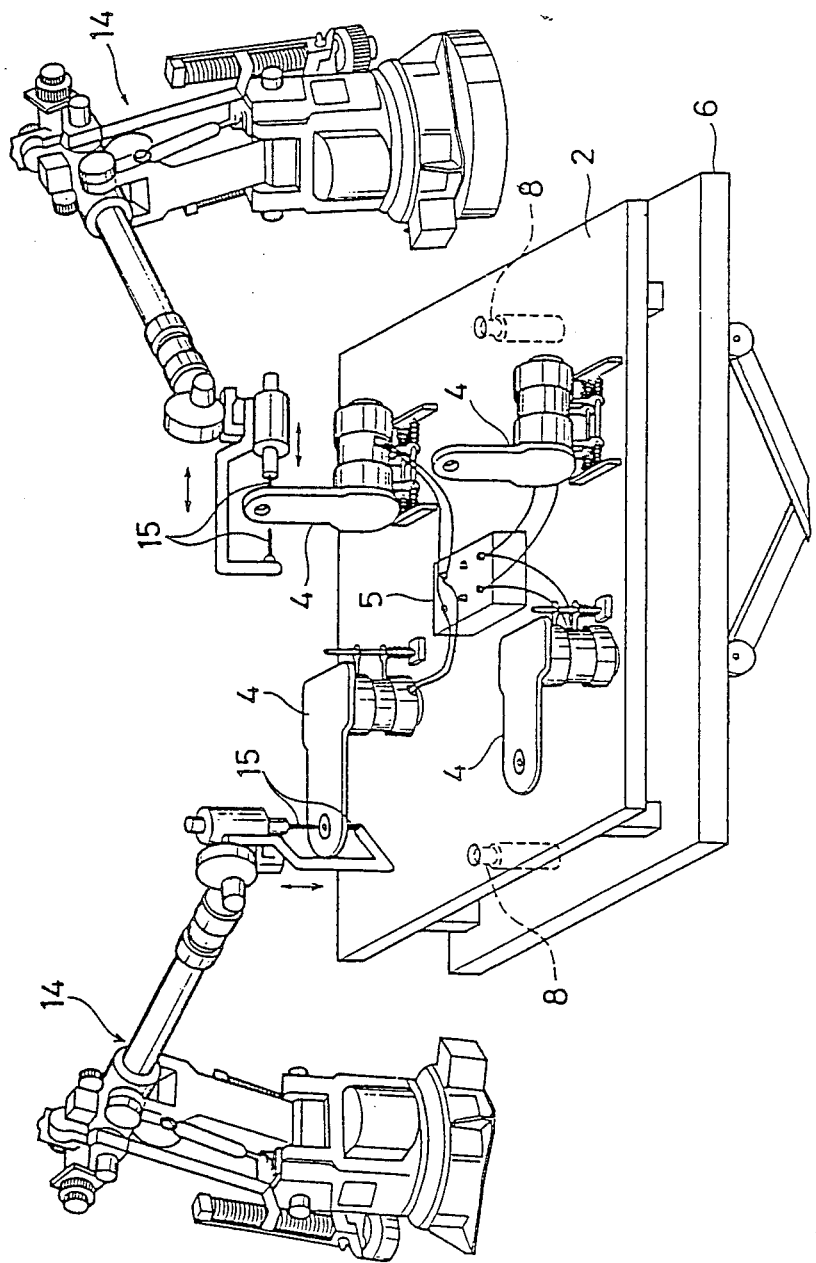
FIG. 4 is a perspective view indicative of a condition in which the welding electrodes of two spot welding machines are simultaneously being ground by the apparatus of FIG. 1.

As shown in FIG. 3, each automatic dresser 4 is comprised of a driving motor 9, a base plate 10 securely connected to a housing of the driving motor 9, a grinding edge 11 rotatably supported on the base plate 10 and a chain mechanism 12 for transmitting rotary force of the driving motor 9 to the grinding edge 11. The automatic dressers 4 are so mounted on the stand 2 that the grinding edges 11 thereof are directed sideways or upwards according to installation conditions of the spot welding machines.

With the use of the automatic grinding apparatus having the above described construction, the method of the present invention of automatically grinding the welding electrodes of respective spot welding machines is performed as follows.

When the time has come that requires the welding electrodes of respective spot welding machines to be ground, the stand 2 is initially placed on and transported by one of a plurality of hangers 13 of the work transport means 1, as shown in FIG. 2. The work transport means 1 transports a plurality of works W, for example, body structures of a certain automobile vehicle in a condition in which the works W are placed on respective hangers 13. When the stand 2 has reached one of the work stations, the work receiving jig 6 is caused to move upwards by an elevating mechanism 16 thereof. Subsequently, the stand 2 is properly positioned with respect to and placed on the work receiving jig 6 in a fashion such that the top end portions of the positioning pins 8 of the work receiving jig 6 are inserted into the through-openings 7 of the stand 2.

The fact that the stand 2 has reached one of the work stations is detected by a sensor means (not shown). In this event, the driving motors 9 of the automatic dressers 4 are driven to rotate respective grinding edges 11 for a predetermined period of time set by a timer. The spot welding machines 14 located at the corresponding work station and arranged along the welding line are then operated so that the welding electrodes 15 mounted on end portions of their arms may be brought into contact with and ground by the grinding edges 11 of respective automatic dressers 4. The grinding control for the spot welding machines 14 is initiated in response to an output signal from a sensor or the like which detects that the stand 2 has been transported to the work station. Furthermore, this control is performed on the basis of data indicative of locations of the automatic dressers 4 memorized in advance in control portions of respective spot welding machines 14.

Upon completion of the electrode grinding for the spot welding machines 14 located at one work station, the stand 2 is transported to the adjoining work station by the transport means 1 so as to be of service to the electrode grinding of the spot welding machines 14 provided in this work station.

As described above, according to the method of the present invention of automatically grinding the spot welding electrodes, the stand 2 on which the automatic dressers 4 are securely mounted is transported to each work station by making use of the work transport means 1 comprising the overhead conveyor or the like. After the stand 2 has come to the location where the spot welding machines 14 are installed, the welding electrodes 15 of respective spot welding machines 14 are automatically ground by the corresponding automatic dressers 4. Consequently, the electrodes of respective spot welding machines 14 installed at a plurality of work stations can be automatically successively ground by a single grinding apparatus without interrupting the operation of the welding line. Accordingly, as occasion demands, the welding electrodes 15 can be readily ground without lowering the productivity of the welding line. Moreover, the cost of equipment and maintenance can be lowered as compared with the case in which a plurality of spot welding machines are provided with respective grinding machines.

Besides, in the automatic grinding apparatus of the present invention, a pair of through-openings 7 are formed in the stand 2 having thereon a plurality of properly positioned automatic dressers 4 and engage with respective positioning pins 8 provided on each work receiving jig 6 of the welding line at the time the electrodes of the spot welding machines are required to be ground. Accordingly, the automatic dressers 4 can be so set as to correspond to their proper positions on the work receiving jig 6. If the locations of the automatic dressers 4 have been stored in the control portions of respective spot welding machines 14 in advance, the electrodes 15 of the welding machines 14 can be readily and accurately ground without the necessity of complicated operations of confirming the locations of the automatic dressers 4.

It is to be noted that in the above described embodiment, although the positioning of the automatic dressers 4 is performed through the engagement between the positioning pins 8 of each work receiving jig 6 and the through-openings 7 formed in the stand 2, the automatic dressers 4 may be properly positioned with respect to each work receiving jig 6 by making use of a plurality of sensors for detecting the locations of the automatic dressers 4.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

We claim:

1. A method of automatically grinding an electrode for spot welding using, said method comprising the steps of:

transporting, with the use of a work transport means of a welding line, a stand having thereon at least one automatic dresser which is capable of grinding a welding electrode of a spot welding machine; and automatically grinding said electrode by said automatic dresser when said stand has reached a work station which is provided with at least one of a plurality of spot welding machines installed along said welding line.

2. The method according to claim 1, wherein said work transport means comprises a conveyor having a plurality of hangers.

3. The method according to claim 1, wherein said stand is properly positioned with respect to and placed on a work receiving jig provided with an elevating mechanism.

4. The method according to claim 1, wherein said automatic dresser comprises a driving motor, a grinding edge and a chain mechanism.

5. The method according to claim 1, wherein said automatic dresser is so mounted on said stand as to be directed sideways or upwards.

6. The method according to claim 1, wherein a control portion of said spot welding machine memorizes the relative position of said automatic dresser on said stand.

7. An apparatus for automatically grinding a welding electrode of each of a plurality of spot welding machines installed along a welding line which is provided with a work transport means for successively transporting a plurality of works, each of which is placed on a work receiving jig, said apparatus comprising:

a stand transported by said work transport means;

at least one automatic dresser properly positioned on said stand; and a positioning means for positioning said stand with respect to said work receiving jig.

8. The apparatus according to claim 7, wherein said work transport means comprises a conveyor having a plurality of hangers.

9. The apparatus according to claim 7, wherein said work receiving jig is provided with an elevating mechanism for moving said work receiving jig up and down.

10. The apparatus according to claim 7, wherein said automatic dresser comprises a driving motor, a grinding edge and a chain mechanism.

11. The apparatus according to claim 7, wherein said automatic dresser is so mounted on said stand as to be directed sideways or upwards.

12. The apparatus according to claim 7, wherein said spot welding machine has a control portion for memorizing the relative position of said automatic dresser on said stand.

\* \* \* \* \*